United States Patent [19]
Walker

[11] Patent Number: 5,709,168
[45] Date of Patent: Jan. 20, 1998

[54] FOOD RECEIVING LINER FOR AN ANIMAL FEEDER

[76] Inventor: Robert T. Walker, 13027 Blairwood Dr., Studio City, Calif. 91604

[21] Appl. No.: 706,770

[22] Filed: Sep. 30, 1996

Related U.S. Application Data

[63] Continuation of Ser. No. 354,428, Dec. 12, 1994, abandoned.

[51] Int. Cl.$^6$ .................... A01K 5/01; A01K 7/00
[52] U.S. Cl. .................................................. 119/61
[58] Field of Search ................. 119/61, 51.01, 119/52.1, 53.5, 54, 60, 72, 74; 220/407; 206/204

[56] References Cited

U.S. PATENT DOCUMENTS

| | | |
|---|---|---|
| 3,128,904 | 4/1964 | Reilly ........................ 220/407 X |
| 3,448,913 | 6/1969 | Wolff ........................ 220/407 X |
| 3,527,192 | 9/1970 | Ferrara ...................... 119/61 |
| 3,991,719 | 11/1976 | Bruce ........................ 119/61 |
| 4,724,955 | 2/1988 | Martin et al. ............... 206/204 |
| 4,949,678 | 8/1990 | Demko ....................... 119/61 |
| 4,978,231 | 12/1990 | Ling et al. ................. 220/407 X |
| 5,209,184 | 5/1993 | Sharkan et al. ............. 119/61 |

*Primary Examiner*—Thomas Price
*Attorney, Agent, or Firm*—Robert J. Schaap

[57] ABSTRACT

A liner for animal feeders designed to receive dry and moist food and liquid beverage to be consumed by the animal. Most animal feeders usually comprise a tray or dish in the nature of a bowl to receive the dry food or liquid. The liner is sized and shaped to fit over the bowl and has a base wall and an enclosing side wall with an open top. The side wall integrally merges into a rim and a downwardly struck peripheral flange with the latter to engage the exterior surface of the animal feeder sidewall. A plurality of liners are nestable in each other and are capable of being packaged in the nested condition.

8 Claims, 2 Drawing Sheets

FOOD RECEIVING LINER FOR AN ANIMAL FEEDER

This is a continuation of Ser. No. 08/354,428 filed on Dec. 12, 1994, now abandoned.

BACKGROUND OF THE INVENTION

1. Field of the Invention

This invention relates in general to certain new and useful improvements in animal feeder accessories and more particularly, to a disposable liner adapted to fit within an animal feeding bowl for receiving moist or dry food or liquid beverage for the animal.

2. Brief Description of Related Art

Animal feeders usually exist in the nature of animal feeding bowls or trays. In essentially all cases, they adopt the form of a receptacle sized to receive dry food or wet food or plain liquid. After a short period of time however, the feeders become dirty and unsightly. In addition, accumulated food or liquid can often become bacterial infested, hot only resulting in foul smells, but relatively poor health conditions for the animal which is being fed.

In an effort to avoid the constant cleaning required for these animal feeders, some pet owners have resorted to the wrapping of an aluminum foil or plastic transparent foil or wrap in the bowl or feeder so as to hopefully eliminate the constant cleaning necessity. In this case, after a short period of time, the foil or plastic wrap is removed and replaced with an additional piece of foil or plastic wrap. However, the wrapping of a piece of foil or plastic wrap becomes somewhat difficult, since the plastic foil or aluminum foil is not designed to fit a particular feeder and in particular, one having a somewhat circular shape. The owner or animal attendant therefore spends a substantial amount of time attempting to create a make-shift liner for the feeder and oftentimes ends up with a liner which is not completely liquid-proof. As a result, the make-shift liner does not accomplish the goal for which it was intended.

There have been other liners used for other types of equipment. However, heretofore, there has been no effective disposable or reusable low cost liner for animal feeders which can be packaged with like liners in a small compact unit and which is highly effective for its intended use.

OBJECTS OF THE INVENTION

It is therefore, one of the primary objects of the present invention to provide a liner for animal feeders which is sized and shaped to fit within the feeder and is capable of receiving both dry and moist food and liquid without soiling the animal feeder.

It is another object of the present invention to provide a food and liquid receiving liner of the type stated which is relatively impervious to most liquids to be fed to animals and which is readily fitted within an animal feeder and easily removed therefrom.

It is a further object of the present invention to provide a liner for animal feeders which is capable of being stacked and nested with like liners and packaged in small compact units.

It is also an object of the present invention to provide a liner for animal feeders which reduces the need and at least the frequency for cleaning of the animal feeders.

It is an additional object of the present invention to provide a liner for animal feeders of the type stated which is highly effective in use and which can be produced at relatively low unit costs.

With the above and other objects in view, my invention resides in the novel features of form, construction, arrangement and combination of components forming part of the liner for an animal feeder as hereinafter described and pointed out in the claims.

BRIEF SUMMARY OF THE INVENTION

The invention relates to a unique liner for animal feeders. In the most typical form, the animal feeder exists in the form of a bowl having a continuous side wall and usually a cylindrically shaped side wall, along with an enclosing bottom wall. In this way, the animal feeder forms an interior reservoir for receipt of the liquid or food, or both.

The liner of the present invention comprises a continuous side wall having an enclosing bottom wall sized to fit snugly, but nevertheless removably, within the reservoir of the animal feeder. Moreover, the liner is provided at its upper end with a horizontally disposed rim adapted to extend over the rim of the animal feeding bowl. The liner is also provided with a depending continuous flange, the latter adapted to engage the exterior surface of the upper portion of the animal feeder surrounding the rim of the animal feeder. In this way, the liner can be retentively held in place and easily removed from the animal feeder.

The liner is constructed so that it can be easily molded or formed in conventional molding operations. For this purpose, the liner is preferably formed of moldable or formable plastic materials. Moreover, the liners are easily and readily nestable with one another so that a large number of these liners may be packaged in a small compact unit for purposes of marketing and storage.

The liners of the present invention can be made in a form where they are relatively thin in construction, inexpensive and therefore, readily disposable. In addition, these liners could be more of a reusable type liner adapted for cleaning and reuse in an animal feeder. Further, means can be provided for releasibly, but nevertheless retentively, holding the liner in a position on the animal feeder. These means for retentively holding could adopt the form of adhesive sections, removable clips or the like.

This invention possesses many other advantages and other purposes which may be made more clearly apparent from a consideration of the forms in which it may be embodied. These forms are shown in the drawings forming a part of and accompanying the present specification. They will now be described in detail for the purposes of illustrating the general principles of the invention. However, it is to be understood that the following detailed description and the accompanying drawings are not to be taken in a limiting sense.

DETAILED DESCRIPTION OF THE DRAWINGS

Having thus described the invention in general terms, reference will now be made to the accompanying drawings in which:

Figure 6:
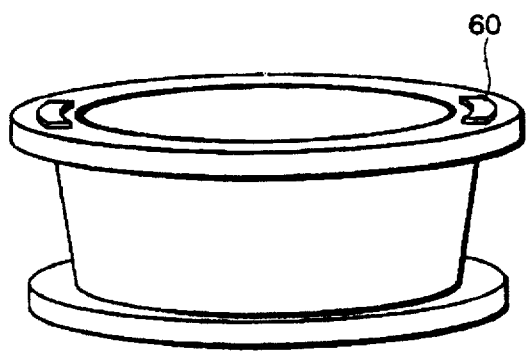
FIG. 6 is a perspective view of a modified form of feeder which may receive a liner in combination therewith.
Figure 7:
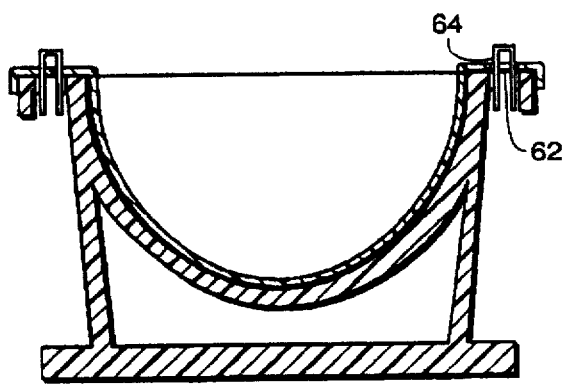
Figure 9:
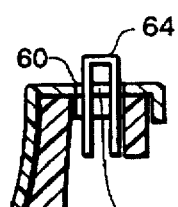
Figure 8:
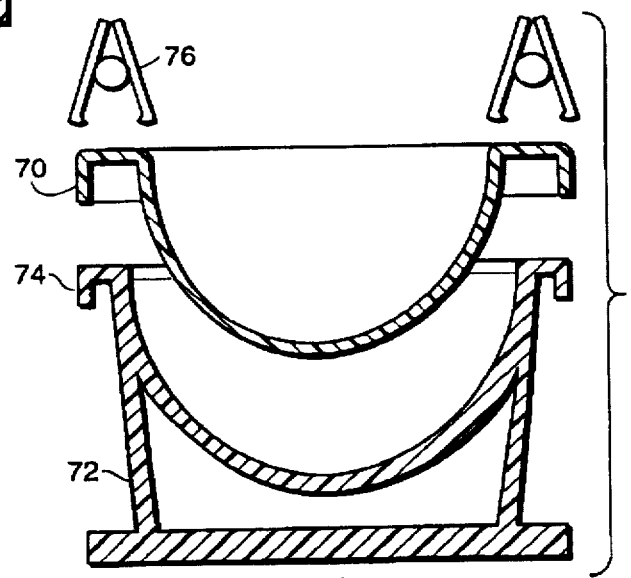

FIG. 7 is a vertical sectional view of a liner which may be used with the animal feeder of FIG. 6 and having clip means for retentively but removably holding the liner thereon; and FIG. 8 is a partially exploded vertical sectional view showing a modified form of clip means for retentively but removably holding a liner in position in an animal feeder; and FIG. 9 is a slightly enlarged fragmentary sectional view showing a portion of the liner and bowl arrangement utilizing a clip for securement of the liner to the bowl.

DETAILED DESCRIPTION OF THE PREFERRED EMBODIMENTS

Referring now in more detail and by reference characters to the drawings which illustrate preferred embodiments of the present invention, A designates an animal feeder which is of generally conventional construction and B designates a feed and liquid-receiving insert for use with the animal feeder A.

The animal feeder A generally comprises a baseplate, such as a circular-shaped base plate 10 for disposition on a supporting surface, such as a table, floor or the like. Secured to and extending upwardly from the baseplate 10 is a feeder housing 12 comprising a cylindrically shaped outer side wall 14 and an inner upwardly concaved shaped reservoir-forming wall 16 forming an interior cavity 18 for receipt of a food or liquid to be consumed by an animal. An upper rim 20 connects the interior reservoir-forming wall 16 and the outer cylindrically shaped wall 14.

Figure 1:
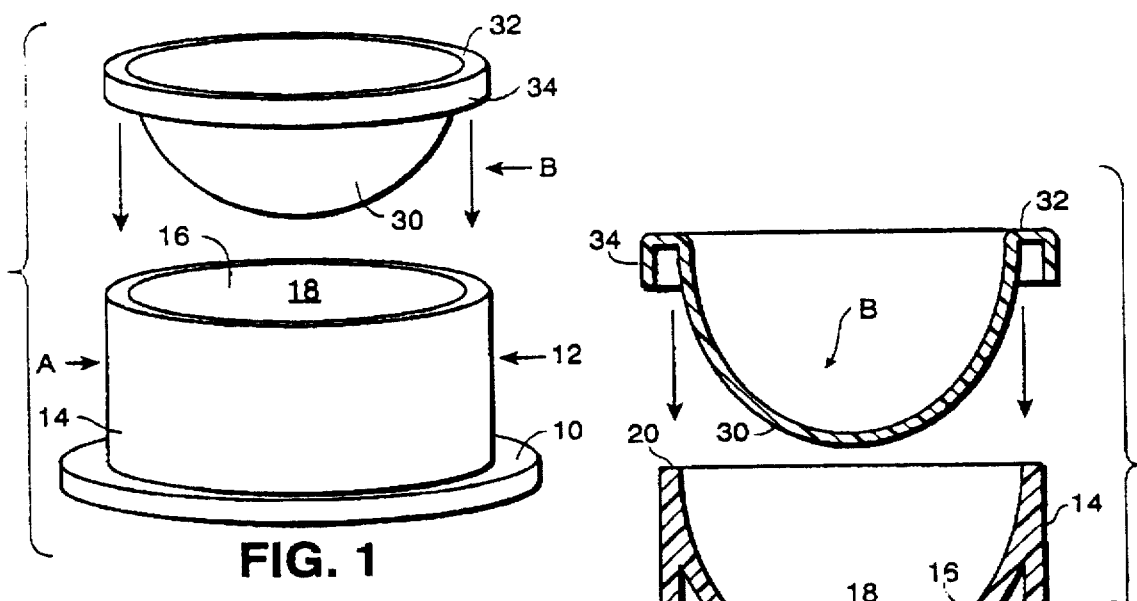
FIG. 1 is an exploded perspective view showing a liner for use with a conventional animal feeder.
Figure 2:
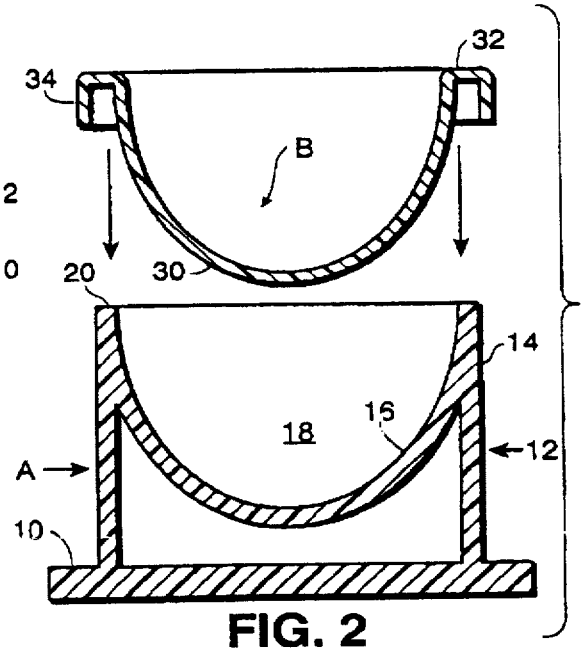
FIG. 2 is an exploded vertical sectional view, similar to FIG. 1 and showing the use of the liner of the present invention in connection with a conventional animal feeder.

In the embodiment of the feeder A, as illustrated in FIGS. 1 and 2, it can be seen that the reservoir forming wall 16 is arcuately shaped and somewhat hemispherical. However, this reservoir forming wall 16 could adopt other shapes, as hereinafter described and illustrated.

Figure 3:
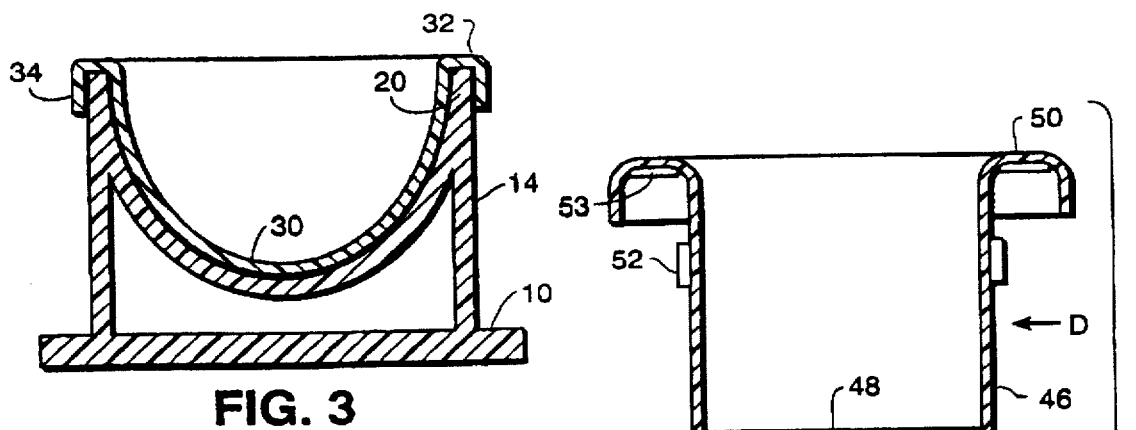
FIG. 3 is a vertical sectional view showing the liner located in food or liquid receiving position in an animal feeder.

Provided for use with the animal feeder A is the insert B, as best shown in FIGS. 1-3 of the drawings. In this case, the insert B comprises a hemispherically shaped wall 30 which conforms to and fits snugly within the hemispherically shaped reservoir-forming wall 16 of the animal feeder. The hemispherically shaped wall 30 of the insert B also integrally merges into an upper rim 32 which is adapted to fit upon and engage the rim 20 of the animal feeder A. Finally, the rim 32 of the insert integrally merges into a downwardly extending cylindrically shaped annular flange 34 which engages the upper portion of the exterior wall 14, in the manner as best illustrated in FIG. 3 of the drawings. The liner B is removably disposed within the animal feeder A so as to be readily removable therefrom and which permits a new liner to be easily inserted in the animal feeder A.

The animal feeder A is typically formed of any of a number of conventional plastic materials, although it could be formed of a glass, metal or the like. The liner B, on the other hand, is also formed of a relatively thin disposable plastic material. In this case, the material used in the formation of the liner B should preferably be biodegradable and one which is environmentally benign. Furthermore, it must be non-toxic to an animal, such as a dog, cat or the like. Thus, if an animal should attempt to chew upon or ingest a portion of the liner B, it should not present any toxicity to the animal.

The liner is preferably formed of a very lightweight polyethylene material, such as a low density polyethylene, polyvinyl chloride or like plastic. Furthermore, the liner is preferably molded as, for example, in any conventional injection molding operation, blow molding operation, etc.

Figure 4:
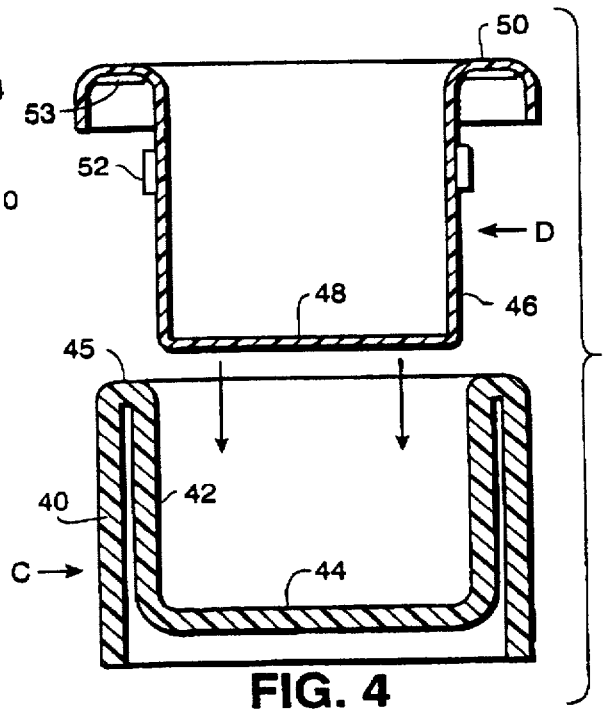
FIG. 4 is an exploded vertical sectional view, similar to FIG. 2, and showing a modified form of liner for use with a modified form of animal feeder.

FIG. 4 illustrates a modified form of animal feeder C and which is similar to the animal feeder A of FIGS. 1-3. In this case, the animal feeder C comprises a cylindrically shaped side wall 40 having an interior reservoir-forming wall 42 integrally merging into a relatively flat bottom wall 44. The interior wall 42 connects with the exterior cylindrically shaped side wall 40 by means of an upper horizontal rim 45.

An insert or liner D is also provided for use with the animal feeder C and has a cross-sectional shape and size similar to the animal feeder C. In this case, the liner D comprises a cylindrically shaped wall 46 having a flat bottom wall 48. The cylindrically shaped side wall 46 is designed to fit snugly against the reservoir-forming wall 42 and the bottom wall 48 is designed to fit against the bottom wall 44 of the animal feeder C. The liner D has an upper annularly extending rim 50 which engages the rim 44 of the animal feeder and an integrally formed downwardly struck annular flange 52 which engages the upper portion of the exterior cylindrically shaped wall 40. In this respect, the operation of the liner, in connection with the animal feeder, is similar to that previously described.

It is also possible to use a plurality of adhesive sections 52 extending around the side wall 46 of the liner. In this way, the liner can be adhesively, although nevertheless removably, attached the inside of the animal feeder. This will eliminate the problem of larger animals, such as large dogs, causing an accidental removal of the liner from the animal feeder, as, for example, by flicking with the tongue. The adhesive sections could also be located under the rim 50 so that clearance is not a problem if the liner does not fit snugly within the animal feeder. For that matter, the adhesive sections could be located anywhere on the liner so as to be releasibly engageable with the animal feeder.

It is also possible to use an annular band of an adhesive 52 which extends completely around the side wall 46 in place of individual segments. In any embodiment in which an adhesive section is used, this section may be covered by a releasible cover strip which would then be discarded during use.

The illustration and description of the liners and associated animal feeders are only illustrative of a large number of feeder sizes and shapes which are available and liners which are adapted to fit those feeders. Thus, a liner can be formed for any conventional feeder in accordance with the present invention. It is important that the liner be impervious to a liquid, as previously described and also non-toxic to an animal. Furthermore, it should include an upper rim and at least a portion of an outer annular flange to engage the exterior wall of the feeder and thereby hold the liner in place on the feeder.

It is also possible to provide a reusable liner. For this purpose, the liner itself may be made of glass or a more durable plastic material. Thus, from time to time, the attendant or owner of the animal feeder would merely remove the liner for cleaning much in the same manner as normal dishware.

Other means for releasibly holding the liner to the animal feeder could also be employed. FIGS. 6 and 7 illustrate an arrangement in which reusable clips can be located in the liner. In this case, the liner and animal feeder may be provided as a combination whereas, in other cases, the liner could be conventionally used with almost any conventional type of animal feeder. In the embodiment of the invention, as illustrated, in FIGS. 6 and 7, the food receiving bowl is provided on its upper rim with a pair of slots 60. The liner itself is also provided with corresponding slots 62 sized to receive releasible spring clips 64. Thus, the user of the device would merely insert the spring clips 64 through the openings, i.e., slot 62, in the liner and through the slots 60 in the animal feeder to releasibly but, nevertheless, retentively hold the liner.

FIG. 8 illustrates a further means for releasibly holding a liner in position on an animal feeder. In the embodiment of FIG. 8, there is provided a liner 70 adapted for removable disposition over a food receiving bowl 72 of the type having a peripherally extending rim 74. A pair of removable spring-type clips 76 are also provided with the liner. These spring-type clips may adopt the form of the so-called "alligator clips" which releasably engage the exterior of the liner for clamping the same to the rim 74.

The above-described mechanisms for holding the liner onto the animal feeder are only illustrative of a large number of means which could be employed for this purpose. Thus, in addition to adhesive sections and clips, other types of mechanisms to releasably, but nevertheless removably hold the liner in position could also be employed.

Figure 5:
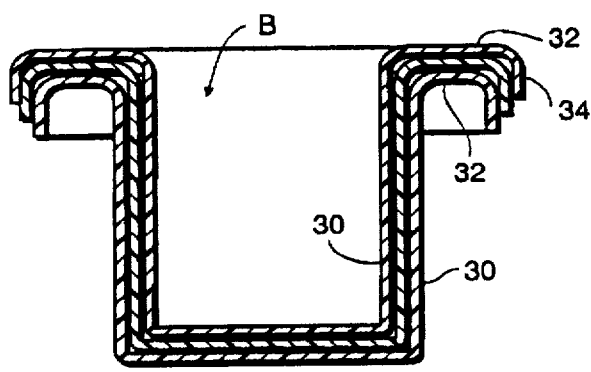
FIG. 5 is a vertical sectional view showing a plurality of liners of the present invention in a stacked and nested position.

FIG. 5 illustrates a plurality of liners which are in stacked and nested arrangement. The liners are sufficiently thin and flexible so as to be capable of being yieldable and stacked in the arrangement as illustrated in FIG. 5. In this respect, the thickness of the liner is fairly thin so that it is relatively easy to use, pliable to fit the animal feeder and readily crushable for disposal.

Thus, there has been illustrated and described a unique and novel liner for use with an animal feeder which fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A combination of a removable and disposable Liner for use with and in combination with an animal feeder of the type having an exterior wall and an inwardly presented continuous interior wall defining an interior cavity for receipt of food or liquid and an upper rim which is integral between and connects the interior wall and the exterior wall of the feeder, said combination comprising:

a) a liner enclosing side wall fitted within the interior cavity of the animal feeder and snugly engaging the inwardly presented continuous interior wall which defines the cavity of the animal feeder;

b) a peripheral exterior flange on said wall of said liner engaging the exterior wall of said animal feeder sized and shaped to snugly, but nevertheless, removably retain said liner on the animal feeder;

c) a rim on said liner which is integral between and connects the exterior flange of the liner to the enclosing side wall of the liner and which is engaged with the upper rim on the animal feeder, said rim of said liner and said peripheral exterior flange on said liner being in intimate contact with the rim of the feeder and the exterior wall of the feeder and the enclosing side wall of the liner being sized to be in intimate contact with the continuous interior wall of the feeder when the liner is disposed on the feeder;

d) mechanical fastener means for cooperatively connecting the liner to the animal feeder at or adjacent to the region of the upper rim on the animal feeder and the rim on the liner to prevent unauthorized removal of the liner from the interior cavity, said mechanical fastener means comprising a clip which extends through alignable openings in the rim of the liner and the upper rim of the animal feeder to enable a releasible attachment of the liner to the animal feeder; and e) said liner being formed of a material which is of a thin plastic material, non-toxic to animals using the animal feeder and which is relatively thin so as to be crumbled and disposable.

2. A combination of an animal feeder with a liner therein for retention of food or liquid to be consumed by the animal, said combination comprising:

a) an animal feeder bowl having an inner continuous side wall;

b) a bottom wall formed with said side wall and enclosing said side wall at the lower end thereof to form a cavity for the normal retention of food or liquid to be consumed by an animal;

c) an outer wall connected to said inner continuous side wall by a rim;

d) an animal liner having a continuous wall which is disposed against the inner side wall of the animal feeder;

e) an enclosing bottom on said continuous wall and enclosing the liner to form a receptacle for the receipt of food or liquid in said liner when disposed in said cavity;

f) a rim formed on said liner to engage the rim of said feeder;

g) a peripherally extending flange around said rim of said liner to engage the exterior wall of said animal feeder; and h) mechanical fastener means cooperatively connecting the liner to the animal feeder at or adjacent to the region of the rim on the animal feeder and the rim of the liner to prevent unauthorized removal of the liner from the interior of the cavity, said mechanical fastener means comprises a clip which extends through alignable openings in the rim of the liner and the upper rim of the animal feeder to enable a releasible attachment of the liner to the animal feeder.

3. A combination of removable and disposable liner for use with and in combination with an animal feeder of the type having an exterior wall and an inwardly presented continuous interior wall defining an interior cavity for receipt of food or liquid and an upper rim which is integral between and connects the interior wall and the exterior wall of the feeder, said combination comprising:

a) a liner enclosing side wall fitted within the interior cavity of an animal feeder and snugly engaging the inwardly presented continuous interior wall which defines the cavity of the animal feeder;

b) a peripheral exterior flange on said wall of said liner engaging the exterior wall of said animal feeder and sized and shaped to snugly, but nevertheless, removably retain said liner on the animal feeder;

c) a rim on said liner which is integral between and connects the exterior flange of the liner to the enclosing side wall of the liner and which is located to engage the upper rim on the animal feeder, said rim of said liner and said peripheral exterior flange on said liner being in intimate contact with the rim of the feeder and the exterior wall of the feeder and the enclosing side wall of the liner being sized to be in intimate contact with the continuous interior wall of the feeder;

d) mechanical fastener means cooperatively connecting the liner to the animal feeder at or adjacent to the region of the upper rim on the animal feeder and the rim on the liner to prevent unauthorized removal of the liner from the interior cavity, said mechanical fastener means comprising a clip which extends over the exterior flange on the wall of the liner and the exterior wall of the animal feeder for engagement of the same; and e) said liner being formed of a material which is of a thin plastic material, non-toxic to animals using the animal feeder and which is relatively thin so as to be crumbled and disposable.

4. A combination of an animal feeder with a liner therein for retention of food or liquid to be consumed by the animal, said combination comprising:

a) an animal feeder bowl having an inner continuous side wall;

b) a bottom wall formed with said side wall and enclosing said side wall at the lower end thereof to form a cavity for the normal retention of food or liquid to be consumed by an animal;

c) an outer wall connected to said inner continuous side wall by a rim;

d) an animal liner having a continuous wall which is disposed against the inner side wall of the animal feeder;

e) an enclosing bottom on said continuous wall and enclosing the liner to form a receptacle for the receipt of food or liquid in said liner which disposed in said cavity;

f) a rim formed on said liner to engage the rim of said feeder;

g) a peripherally extending flange around said rim of said liner to engage the exterior wall of said animal feeder; and h) mechanical fastener means cooperatively connecting the liner to the animal feeder at or adjacent to the region of the rim on the animal feeder and the rim of the liner to prevent unauthorized removal of the liner from the interior of the cavity, said mechanical fastener means comprises a clip which engages the outer wall of said feeder bowl and the peripherally extending flange of said liner and extends over the rim on the liner and the rim on the feeder.

5. A combination of a removable and disposable liner for use with and in combination with an animal feeder of the type having an exterior wall and an inwardly presented continuous interior wall defining an interior cavity for receipt of food or liquid and an upper rim which connects the interior wall and the exterior wall, said combination comprising:

a) a liner enclosing side wall fitted within the cavity of the animal feeder and snugly engaging the inwardly presented continuous interior wall which defines said cavity;

b) a peripheral exterior flange on said wall of said liner for engagement of the exterior wall of said animal feeder to thereby snugly, but nevertheless, removably retain said liner on said animal feeder;

c) a rim on said liner which connects the exterior flange of the liner to the enclosing side wall of the liner and which engages the upper rim on the animal feeder;

d) mechanical fastener means cooperatively connecting the liner to the animal feeder at or adjacent to the region of the upper rim on the animal feeder and the rim on the liner to prevent unauthorized removal of the liner from the interior cavity, said mechanical fastener means comprises a clip which extends through alignable openings in the rim of the liner and the upper rim of the animal feeder to enable a releasible attachment of the liner to the animal feeder; and e) said liner being formed of a material which is of a thin plastic material, non-toxic to animals using the animal feeder and which is relatively thin so as to be crumbled and disposable.

6. A removable and disposable liner for use with an animal feeder of the type having an exterior wall and an inwardly presented continuous interior wall defining an interior cavity for receipt of food or liquid and an upper rim which is integral between and connects the interior wall and the exterior wall of the feeder, said liner comprising:

a) an enclosing side wall adapted to fit within the interior cavity of the animal feeder and snugly engaging the inwardly presented continuous interior wall which defines the cavity of the animal feeder;

b) a peripheral exterior flange on said wall of said liner engaging the exterior wall of said animal feeder sized and shaped to snugly, but nevertheless, removably retain said liner on said animal feeder;

c) a rim on said liner which is integral between and connects the exterior flange of the liner to the enclosing side wall of the liner and which is engaged with the upper rim on the animal feeder, said rim of said liner and said peripheral exterior flange on said liner sized to be in intimate contact with the rim of the feeder and the exterior wall of the feeder and the enclosing side wall of the liner being sized to be in intimate contact with the continuous interior wall of the feeder when the liner is disposed on the feeder; and d) mechanical fastener means for cooperatively connecting the liner to the animal feeder at or adjacent to the region of the upper rim on the animal feeder and the rim on the liner to prevent unauthorized removal of the liner from the interior cavity, said mechanical fastener means comprising a clip which is extendable through alignable openings in the rim of the liner and the upper rim of the animal feeder to enable a releasible attachment of the liner to the animal feeder; and e) said liner being formed of a material which is of a thin plastic material, non-toxic to animals using the animal feeder and which is relatively thin so as to be crumbled and disposable.

7. A removable and disposable liner for use with an animal feeder of the type having an exterior wall and an inwardly presented continuous interior cavity for receipt of food or liquid and an upper rim which is integral between and connects the interior wall and the exterior wall of the feeder, said liner comprising:

a) a liner enclosing side wall fitted within the interior cavity of an animal feeder and sized to snugly engage the inwardly presented continuous interior wall which defines the cavity of the animal feeder;

b) a peripheral exterior flange on said wall of said liner sized for engagement with the exterior wall of said animal feeder and sized and shaped to snugly, but nevertheless, removably retain said liner on the animal feeder;

c) a rim on said liner which is integral between and connects the exterior flange of the liner to the enclosing side wall of the liner and which is located to engage the upper rim on the animal feeder, said rim of said liner and said peripheral exterior flange on said liner sized to be in intimate contact with the rim of the feeder and the exterior wall of the feeder and the enclosing side wall of the liner being sized to be in intimate contact with the continuous interior wall of the feeder when the liner is disposed on the feeder;

d) mechanical fastener means adapted to cooperatively connect the liner to the animal feeder at or adjacent to the region of the upper rim on the animal feeder and the rim on the liner to prevent unauthorized removal of the liner from the interior cavity, said mechanical fastener means comprising a clip which extends over the exterior flange on the wall of the liner and the exterior wall of the animal feeder for engagement of the same;

e) said liner being formed of a material which is of a thin plastic material, non-toxic to animals using the animal feeder and which is relatively thin so as to be crumbled and disposable.

8. A removable and disposable liner for use with an animal feeder of the type having an exterior wall and an inwardly presented continuous interior wall defining an interior cavity for receipt of food or liquid and an upper rim which connects the interior wall and the exterior wall, said liner comprising:

a) enclosing side wall adapted to fit within the cavity of the animal feeder and snugly engage the inwardly presented continuous interior wall which defines said cavity;

b) a peripheral exterior flange on said wall of said liner for engagement of the exterior wall of said animal feeder to thereby snugly, but nevertheless, removably retain said liner on said animal feeder;

c) a rim on said liner which connects the exterior flange of the liner to the enclosing side wall of the liner and which is located to engage the upper rim on the animal feeder;

d) mechanical fastener means cooperatively connecting the liner to the animal feeder at or adjacent to the region of the upper rim on the animal feeder and the rim on the liner to prevent unauthorized removal of the liner from the interior cavity, said mechanical fastener means comprises a clip which extends through alignable openings in the rim of the liner and the upper rim of the animal feeder to enable a releasable attachment of the liner to the animal feeder; and e) said liner being formed of a material which is of a thin plastic material, non-toxic to animals using the animal feeder and which is relatively thin so as to be crumbled and disposable.

* * * * *